March 23, 1926.  1,577,934
S. PEARCE
CANDY RIBBON FORMING MACINE
Filed Nov. 22, 1922    2 Sheets-Sheet 1
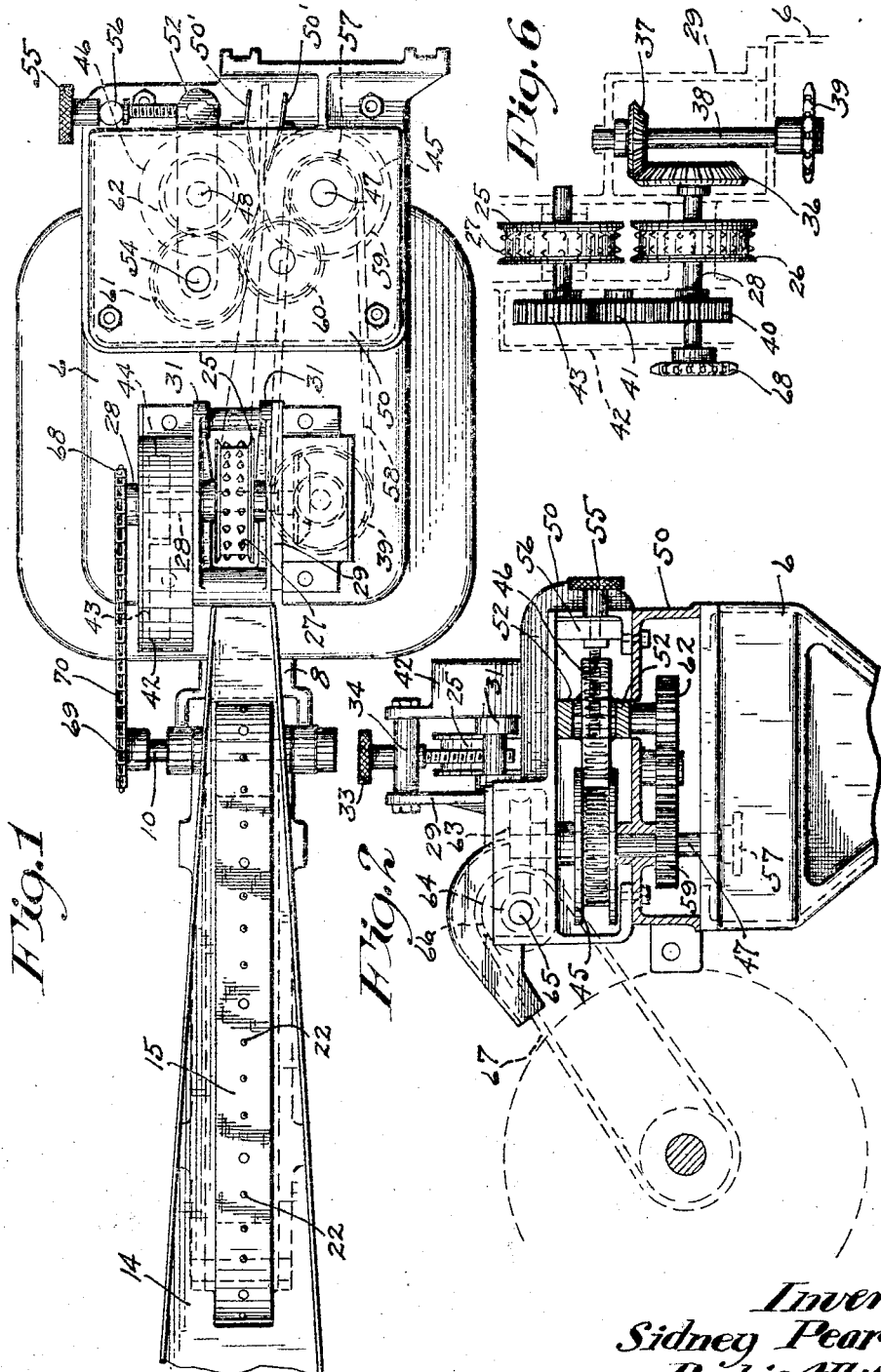
Inventor
Sidney Pearce
By his Attorneys March 23, 1926.
S. PEARCE
CANDY RIBBON FORMING MACINE
Filed Nov. 22, 1922
1,577,934
2 Sheets-Sheet 2
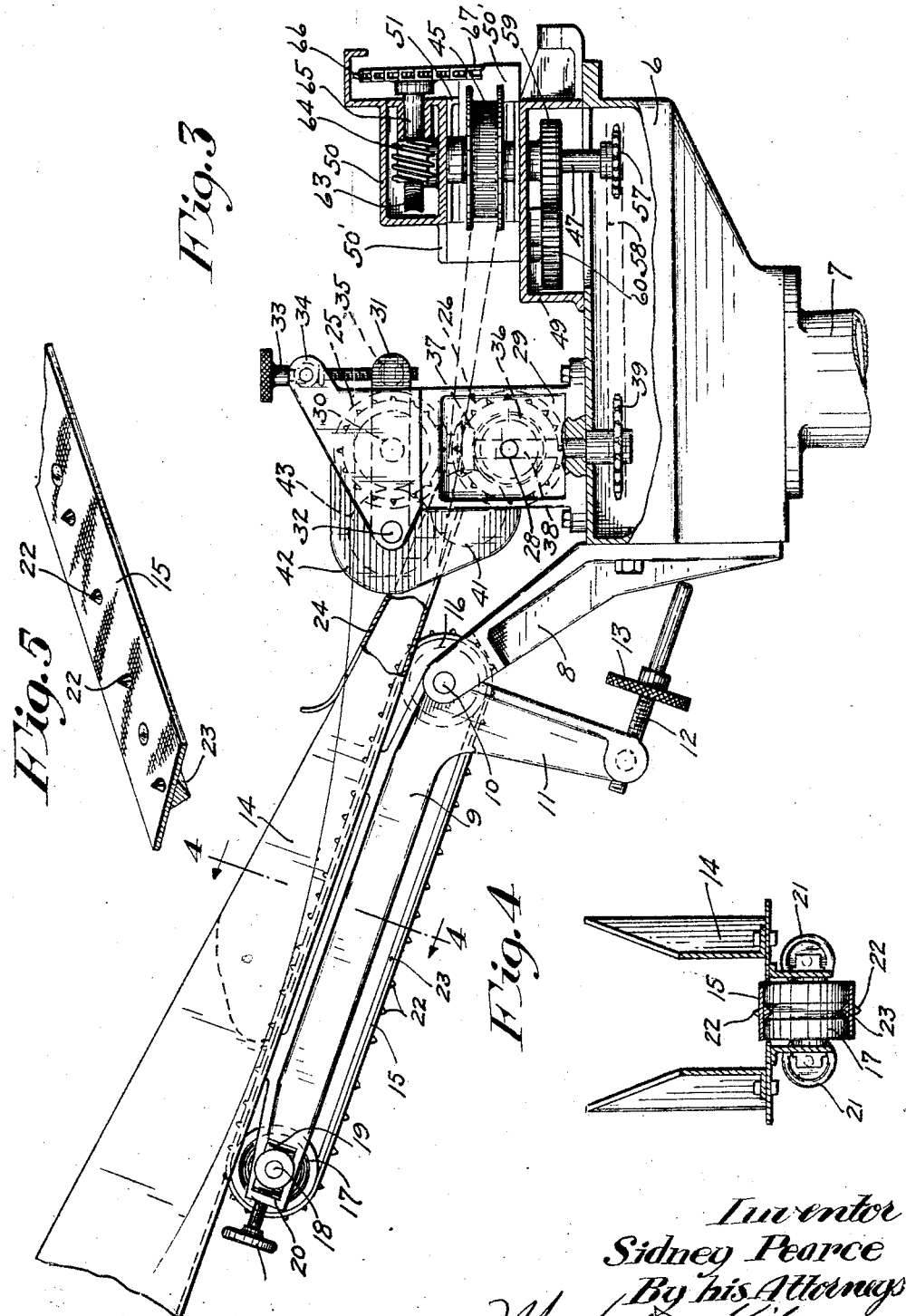
Inventor
Sidney Pearce
By his Attorneys Patented Mar. 23, 1926.

1,577,934

UNITED STATES PATENT OFFICE.

SIDNEY PEARCE, OF MINNEAPOLIS, MINNESOTA, ASSIGNOR TO J. N. COLLINS COMPANY, OF MINNEAPOLIS, MINNESOTA, A CORPORATION OF MINNESOTA.

CANDY-RIBBON-FORMING MACHINE.

Application filed November 22, 1922. Serial No. 602,589.

*To all whom it may concern:*

Be it known that I, SIDNEY PEARCE, a citizen of the United States, residing at Minneapolis, in the county of Hennepin and State of Minnesota, have invented certain new and useful Improvments in Candy-Ribbon-Forming Machines; and I do hereby declare the following to be a full, clear, and exact description of the invention, such as will enable others skilled in the art to which it appertains to make and use the same.

My invention relates to the candy-making art and is directed particularly to an improved machine for automatically forming from a plastic candy batch or slug a ribbon of predetermined cross-section suitable, when cut into sections, to form caramels or like candy pieces.

Hitherto, caramel-forming candy ribbons have been produced by cooperating rollers in machines used to deliver such candy ribbons to caramel-wrapping machines, but in all such earlier machines, it has been necessary for an attendant to almost continuously reduce the candy batch or slug to a rope-like body of such size that the forming rollers would act thereon and reduce the same.

My invention makes a radical improvement in these candy-reducing or candy-ribbon-forming machines and eliminates the necessity of an attendant by providing means which operate automatically on the plastic candy batch or slug to feed the same in proper quantity to preliminary or primary reducing and ribbon-forming rollers, by which the candy batch or slug is reduced to a ribbon having a cross-section somewhat in excess of the desired final cross-section. The candy ribbon thus reduced by the primary forming rollers is next fed to final or secondary forming rollers and, by the latter, is given its desired predetermined cross-section.

This candy-ribbon-forming machine will be arranged to feed directly to a caramel-wrapping machine, which latter machine, as is well known, has means for cutting the ribbon into the proper sections and then for wrapping the caramel-forming sections.

In the accompanying drawings, which illustrate a commercial form of my improved candy-ribbon-forming machine, frequently designated as a caramel-forming machine, like characters indicate like parts throughout the several views.

Referring to the drawings:

Fig. 1 is a plan view of the improved machine;

Fig. 2 is a front elevation of the same, some parts being broken away;

Fig. 3 shows the machine in side elevation, some parts being in vertical section and some parts being broken away;

Fig. 4 is a transverse section on the line 4—4 of Fig. 3;

Fig. 5 is a perspective showing a portion of the candy-feeding belt; and

Fig. 6 is a transverse section on the line 6—6 of Fig. 3.

The operative parts of this improved machine are shown as mounted upon or within a hollow cast base 6 supported on the upper end of a pedestal 7. Rigidly secured to the back of the base 6 and projecting above the same is a forked bracket 8 to which a hopper-supporting frame 9 is pivotally connected by a transverse shaft 10. The pivoted end of the frame 9 is provided with a depending arm 11 through which the threaded end of a stop rod 12 works with threaded engagement. This stop rod is shown as provided with a knurled flange 13 and the projecting end of said rod is engageable with the bracket 8 to hold the frame 9 in different angular adjustments.

Secured on the frame 9 is a forwardly converging trough-like feed hopper 14 formed in its bottom with a long rectangular slot through which works the upper operative face of a feed belt 15. This feed belt 15 is arranged to run over guide rollers 16 and 17, the former of which is secured on the shaft 10 and the latter of which is secured on an idle shaft 18 mounted in bearings 19. The bearings 19 are seated in slots 20 in the extended portion of the frame 9 and are arranged to be drawn rearward by adjusting screws 21 which have threaded engagement with the frame 9 and are swiveled to said bearings. The feed belt 15, on its operative face, is provided with barbs or projections 22 adapted to positively feed the engaged portion of the candy machine; and to give said belt greater frictional driving contact with the collars 16 and 17, it is formed with a flexible V-shaped rib 23 that is adapted to engage V-shaped grooves in said rollers, (see particularly Fig. 4).

The candy batch, while still warm and while it is in a plastic mass or slug, will be placed in a trough-like hopper and will be fed therefrom as hereinafter more definitely described, but it may be here noted that in moving through the contracted delivery end of said hopper, it must pass under a top plate 24 secured to the upper edges of the side flanges of said hopper and extending from the delivery end of said hopper a considerable distance rearward thereon. This plate 24 gives to the delivery end of the hopper a rectangular or approximately rectangular cross-section.

From the feed hopper, the candy is delivered to the preliminary or primary ribbon-forming rollers 25 and 26, both of which are flanged, that is, are formed with peripheral channels. Between their flanges, said rollers 25 and 26 are formed with projecting barbs 27. The lower roller 26 is secured to a shaft 28 journaled in laterally spaced pedestal brackets 29 rigidly secured on top of the hollow base 6. The upper roller 25 is secured to a shaft 30 journaled in the intermediate portion of a bifurcated lever-acting frame 31 pivoted to the pedestal brackets 29 by a shaft 32. The free end of the frame 31 is made vertically adjustable by an adjusting screw 33 that is swiveled to a cross bar 34 that connects the upper portions of the pedestal brackets 29. The threaded lower end of the adjusting screw 33 has threaded engagement with a transverse bar 35 on the free end of the frame 31. Obviously, by means of the screw 33, the upper roller 25 can be set in different vertical adjustments in respect to the lower roller 26.

At its left-hand end, the lower roller shaft 28 is provided with a bevel gear 36 that meshes with a bevel gear 37 secured on the upper end of a short upright shaft 38 journaled in the bearing pedestal 29. The lower end of the shaft 38 is extended through the top of the hollow base 6 and is there provided with a sprocket 39. At its right-hand end, said lower roller shaft 38 is provided with a spur gear 40 that meshes with an intermediate gear 41 journaled within a gear casing 42 secured on and formed as part of the right-hand pedestal bracket 29. The intermediate gear 41 meshes with a second intermediate gear 43 journaled within the gear casing 42 and, in turn, meshing with a spur gear 44 secured on the right-hand end of the upper roller shaft 30. By the chain of gears described, both rollers 25 and 26 will be positively driven in reverse directions and vertical adjustment of the upper roller 25 does not interfere with the transmission of power to said upper roller. The above noted primary forming rollers are, in this preferred arrangement of the machine, arranged to run in a vertical plane or on horizontal axes.

The secondary or final forming rollers 45 and 46 are arranged to run in horizontal planes or on vertical axes and they are secured, respectively, to short upright shafts 47 and 48 that are journaled in gear housings 49 and 50, the former of which is rigidly secured on the top plate of the hollow base 6 and the latter of which has laterally spaced depending side flanges 50' rigidly secured on said gear housing 49. Between the two gear housings and the laterally spaced flanges 50' there is formed a large rectangular opening 51 in which the rollers 45 and 46 are arranged to run. The roller 45 has a rectangular peripheral channel in which the peripheral portion of the roller 46 is arranged to run when the two rollers are adjusted closely enough to cause an interlapping of the two rollers. The shaft 48 of the roller 46, instead of being directly journaled to the gear housings 49 and 50, is journaled directly in the intermediate portion of a bifurcated lever-acting frame 52 that works within the upper gear housing 50 and is pivotally connected thereto by a short vertical shaft 54. To provide for adjustments of the roller 46 toward and from the roller 45, an adjusting screw 55 is swiveled to a bearing 56 on the housing 50 and has threaded engagement with the free end of the frame 52.

The roller shaft 47, at its lower end, is provided with a sprocket 57 over which and a sprocket 39 on the shaft 38 runs a sprocket chain 58. The sprocket 57 is smaller than the sprocket 39, so that the shaft 47 will run faster than the shaft 38; and, as the rollers 25, 26, 45 and 46 have the same or approximately the same diameters, said rollers 45 and 46 will run at a somewhat higher peripheral speed than the said rollers 25 and 26. This produces a stretching of the candy ribbon between the primary and secondary forming rollers and is important, as will hereinafter more clearly appear.

The shaft 47, above its sprocket 57, has a spur gear 59 that meshes with an idle spur gear 60 journaled to the top plate of the gear case 49 and, in turn, meshing with another intermediate spur gear 61 that is journaled on the lower end of the pivot shaft 54. The gear 61 meshes with a spur gear 62 secured on the lower end of the roller shaft 48. By the chain of gears just described, the roller 46 will be positively driven when the shaft 47 is rotated and will be free for adjustments toward and from the roller 45 throughout such adjustments.

Within the upper gear housing 50, a worm gear 63 is secured to the upper end of the shaft 47. The gear 63 meshes with a worm 64 secured on the inner end of a short horizontal shaft 65 that is journaled in the housing 50 and is provided at its outer end with a sprocket 66 over which runs a power-driven sprocket chain or link belt 67. The chain 67 may be power-driven through any suitable connections, to a motor, engine or line shaft.

The lower roller shaft 28, at its right-hand end, is shown as provided with a sprocket 68 that is aligned with a sprocket 69 in the corresponding end of the roller shaft 10. A sprocket chain 70 runs over the sprockets 68 and 69 to transmit motion from the shaft 28 to the shaft 10 and from thence to the feed belt 15. Preferably, the feed belt 15 is given a speed of travel the same or approximately the same as the peripheral speed of the primary feed rollers 25 and 26.

The peripheral surfaces of the secondary rollers 45 and 46, instead of being perfectly smooth, are preferably finely corrugated to increase the tractive action of the candy ribbon. These finely corrugated peripheral surfaces will close up the punctures made by the barbs of the primary wheels 25 and 26 and will give the finished candy ribbon slightly corrugated or roughened faces which will have a quite smooth appearance unless closely inspected. These slightly roughened surfaces are better adapted for wrapping rough than perfectly smooth surfaces, for they have less tendency to stick to the wrapping paper. Of course, more or less of the powdered sugar will remain on the surfaces of the completed ribbon, even after the sections are cut and wrapped in the cutting and wrapping machine.

Operation.

In a general way, the action of the various elements and groups of elements has already been indicated, but a summary of the operation of the complete machine is substantially as follows:

The hopper-supporting frame 9 will be set at the proper inclination to direct the contracted delivery portion of the rough-like hopper 14 toward the space between the primary forming rollers 25 and 26. The batch of caramel or other candy in the form of a lump or slug, still warm enough to be quite plastic and usually coated with pulverized sugar to prevent sticking of the candy to the metallic parts, will be simply placed in the trough-like hopper and allowed to flatten out under the action of gravity or slight initial pressure. When the machine is then started, the power-driven feed belt will be driven in such direction that its bars will produce a slow flow of the lower portion of the lump or mass into the delivery spout end of the hopper and from thence between the primary feed rollers. When once these primary feed rollers grip the end of the mass, the frictional action thereof and the action of their bars will produce a positive flow of such an amount of the mass as can pass between two co-operating rollers 25 and 26. Of course, the amount of candy that will pass between said rollers will depend on the adjustment of the roller 26 in respect to the roller 25. These primary feed rollers, when they once grip the end of the lump or mass, cooperate with the feed belt to keep up the feeding action and the rectangular delivery spout of the hopper prevents too great a quantity of the candy from getting to said primary feed rollers. By the primary feed rollers, the candy is reduced to ribbon form of constant cross-section, but of a cross-section somewhat greater than the desired final cross-section of the caramels.

The candy ribbon thus primarily or partially reduced will be threaded between the secondary or final forming rollers 45 and 46 and will be caused to run between said rollers by the automatic action of the machine. In passing from the primary to the secondary forming rollers, the candy ribbon is turned ninety degrees, so that it will be delivered edgewise in a vertical plane to the caramel machine, which requirement is incident to the construction of the customary caramel machine. In passing between the secondary feed rollers 45 and 46, the candy ribbon will be reduced to a rectangular cross-section, which is the desired cross-section of the caramels. Inasmuch as the secondary feed rollers run at a higher speed than the primary feed rollers, there will be a stretching of the candy ribbon as it passes from the primary to the secondary forming rollers and it will be understood that, when the secondary forming rollers 45 and 46 are adjusted for a certain thickness of caramel, then the primary feed rollers must be adjusted so that the supply of the ribbon-forming candy from between the said primary rollers will be just sufficient to give the stretched ribbon the required quantity for the production of its desired rectangular cross-section in its movement between the secondary or final forming rollers. Hence, the independent adjustability of the primary and secondary rollers, as to quantity of candy permitted to pass between the same, is highly important. From the secondary or final forming rollers, the properly formed candy ribbon will usually be delivered directly to the caramel-cutting and wrapping machine.

The barbs on the primary forming rollers give the same the positive engagement with the candy required to draw the same from the plastic lump or mass, but such barbs produce punch holes in both surfaces of the candy ribbon delivered from between the two primary rollers. These punch holes, however, will be entirely closed as the ribbon runs between the smooth peripheral surface of the secondary rollers and is thereby reduced to a thinner and more perfect rectangular cross-sectional formation.

While this machine is especially adapted for the making of caramels, it may, nevertheless, be used for forming candy ribbons of other kinds of candy or for forming similar ribbons from various other plastic substances. The machine might probably be used for forming ribbons chewing gum substance to be later cut and wrapped, very much on the plan of the caramel-forming and wrapping operation.

The efficiency of this machine has been thoroughly demonstrated in actual use and it has been found that the machine requires no attendant or operator between the times that it is supplied with the one candy lump or slug and the time that the same has been formed into a ribbon and the machine is ready to receive another lump or slug. One person may, therefore, take care of a large number of these machines, whereas other types of machines for performing similar work require the constant attention of an operator to reduce to somewhat definite rope-like form the candy lump or slug for delivery to the forming rollers.

The part 4 has been designated as a trough-like hopper, but it is obvious that it is in the nature of a trough for the reason that it is set in such position that it will constitute the sole suport for the candy or plastic material, and the weight of the candy or plastic material will always be upon the feed belt. The feed belt, as is further evident, in forcing the candy toward the contracted end of the trough-like hopper, contracts the same so that more and more of the material will be directed onto the belt and less and less thereof supported by the tapering bottom portions of the hopper.

What I claim is:

1. In a machine of the kind described, cooperating ribbon-forming rollers operative to reduce a plastic substance to ribbon-like form, a trough-like hopper set at such angle to a horizontal that it will constitute the sole support for the plastic material, said trough-like hopper being tapered toward its delivery end, and a feed belt working through and constituting a part of the bottom of said hopper, said belt being narrower than said hopper and the bottom of said hopper being intact on opposite sides of said feed belt.

2. In a machine of the kind described, cooperating ribbon-forming rollers operative to reduce a plastic substance to ribbon form, a trough-like hopper for directing the plastic material to said rollers, said hopper being tapered toward its delivery end, and a feed belt working through and constituting a part of the bottom of said hopper, said feed belt being more narrow and shorter than said hopper, the bottom of said hopper being intact on opposite sides, at the front and at the rear of said feed belt.

3. The structure defined in claim 2 in which said hopper is provided with a top plate extending at its delivery end back to and overlying the delivery portion of said belt.

4. The structure defined in claim 1 in which said hopper is mounted on a pivot for vertical angular adjustments to vary its inclination.

5. The structure defined in claim 2 in which said hopper is mounted on a pivot for vertical angular adjustments to vary its inclination, and in further combination with a belt-driving shaft coincident with said pivot, and means for driving said shaft while permitting the angular adjustments of said hopper.

6. The structure defined in claim 2 in which said hopper is mounted on a pivot for vertical angular adjustments to vary its inclination, and in further combination with a belt-driving shaft coincident with said pivot, and means for driving said shaft while permitting the angular adjustments of said hopper, said hopper at its delivery end having a relatively short top plate that extends backward to and overlies the delivery portion of said belt.

7. In a machine of the kind described, the combination with ribbon-forming rollers, of a trough-like hopper for delivering plastic material to said rollers, said hopper being mounted on a horizontal pivot for vertical angular adjustments, a feed belt working through the bottom of said hopper and constituting a part of said bottom, driving and guiding wheels for said belt, one of which is journaled coincident with the axis of said hopper pivot, and a belt drive connecting one of said ribbon-forming rollers to said belt-driving wheel, and serving to drive said belt while permitting angular adjustments of said hopper.

In testimony whereof I affix my signature.

SIDNEY PEARCE.